United States Patent
Hudson et al.

(10) Patent No.: US 10,087,903 B2
(45) Date of Patent: Oct. 2, 2018

(54) VEHICLE ENERGY MANAGEMENT

(71) Applicant: Ford Global Technologies, LLC, Dearborn, MI (US)

(72) Inventors: Andrew Hudson, Sterling Heights, MI (US); David Celinske, Wolverine Lake, MI (US); Farouq Mozip, Dearborn, MI (US); John Anthony DeMarco, Lake Orion, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/405,844

(22) Filed: Jan. 13, 2017

(65) Prior Publication Data

US 2018/0202409 A1    Jul. 19, 2018

(51) Int. Cl.
  *F02N 11/08* (2006.01)
  *H01M 10/42* (2006.01)
  *H01M 10/48* (2006.01)
  *H01M 2/10* (2006.01)
  *H01G 11/08* (2013.01)
  *H01G 11/78* (2013.01)

(52) U.S. Cl.
  CPC ...... *F02N 11/0866* (2013.01); *F02N 11/0837* (2013.01); *H01M 2/1077* (2013.01); *H01M 10/4264* (2013.01); *H01M 10/482* (2013.01); *H01M 10/486* (2013.01); *F02N 2011/0885* (2013.01); *F02N 2200/122* (2013.01); *F02N 2300/106* (2013.01); *H01G 11/08* (2013.01); *H01G 11/78* (2013.01); *H01M 2010/4271* (2013.01); *H01M 2220/20* (2013.01)

(58) Field of Classification Search
  CPC ............ F02N 11/0866; F02N 11/0837; F02N 2300/106; F02N 2200/122; F02N 2200/064; F02N 2011/0885; H01M 2/1077; H01M 10/486; H01M 10/482; H01M 2220/20; H01M 2010/4271; H01G 11/08; H01G 11/78
  USPC ........................................ 123/179.3; 701/113
  See application file for complete search history.

(56) References Cited

U.S. PATENT DOCUMENTS

| | | | |
|---|---|---|---|
| 4,321,522 A | 3/1982 | Matsunaga | |
| 4,754,730 A | 7/1988 | Campagna | |
| 6,271,648 B1 * | 8/2001 | Miller | B60K 6/485 219/201 |
| 6,392,388 B1 | 5/2002 | Young | |
| 6,732,043 B2 * | 5/2004 | Schoch | F02N 11/0862 324/433 |
| 7,516,726 B2 * | 4/2009 | Esaka | H02J 7/0019 123/179.3 |

(Continued)

FOREIGN PATENT DOCUMENTS

EP    1044852 A2    10/2000

OTHER PUBLICATIONS

GB Search Report dated Jun. 26, 2018 re GB Appl. No. 1800287.3.

*Primary Examiner* — Hai Huynh
(74) *Attorney, Agent, or Firm* — Frank A. MacKenzie; Bejin Bieneman PLC

(57) ABSTRACT

A computer that includes at least one processor and memory. The processor of the computer can be programmed to execute instructions stored on the memory that include controlling, based on a temperature, which of a plurality of power sources of a vehicle battery are coupled to a starter circuit during a vehicle ignition event.

20 Claims, 5 Drawing Sheets

(56) References Cited

U.S. PATENT DOCUMENTS

| | | | |
|---|---|---|---|
| 7,688,036 B2 | 3/2010 | Yarger et al. | |
| 7,743,649 B1 * | 6/2010 | Salman | F02N 11/0859 |
| | | | 73/114.59 |
| 8,395,350 B2 * | 3/2013 | Sloan | B60K 6/365 |
| | | | 320/105 |
| 8,408,177 B2 * | 4/2013 | Nagoshi | F02N 11/0825 |
| | | | 123/179.4 |
| 8,409,052 B2 * | 4/2013 | Ishikawa | B60W 20/13 |
| | | | 477/3 |
| 8,818,611 B2 * | 8/2014 | Shin | F02N 11/08 |
| | | | 123/339.14 |
| 9,194,310 B2 * | 11/2015 | Tsumori | F02D 29/02 |
| 9,670,891 B2 * | 6/2017 | Miyake | F02N 11/0866 |
| 9,752,547 B2 * | 9/2017 | Spjuth | F02N 11/0866 |
| 2012/0330538 A1 | 12/2012 | Spjuth et al. | |
| 2013/0239921 A1 * | 9/2013 | Almhagen | F02N 11/0866 |
| | | | 123/179.3 |
| 2013/0249468 A1 * | 9/2013 | Bajjuri | F02N 11/0825 |
| | | | 320/104 |
| 2014/0242436 A1 | 8/2014 | Pyzza et al. | |
| 2015/0134231 A1 | 5/2015 | Li et al. | |
| 2015/0188188 A1 | 7/2015 | Zhang et al. | |
| 2016/0040642 A1 | 2/2016 | Miyake et al. | |
| 2016/0082844 A1 | 3/2016 | King et al. | |
| 2016/0153417 A1 * | 6/2016 | Tochigi | F02D 17/04 |
| | | | 123/339.24 |
| 2016/0229403 A1 | 8/2016 | Khafagy et al. | |
| 2017/0106758 A1 * | 4/2017 | Sakatani | B60L 11/18 |
| 2017/0204828 A1 * | 7/2017 | Imura | F02N 11/04 |
| 2017/0259803 A1 * | 9/2017 | Khafagy | B60W 20/13 |

\* cited by examiner

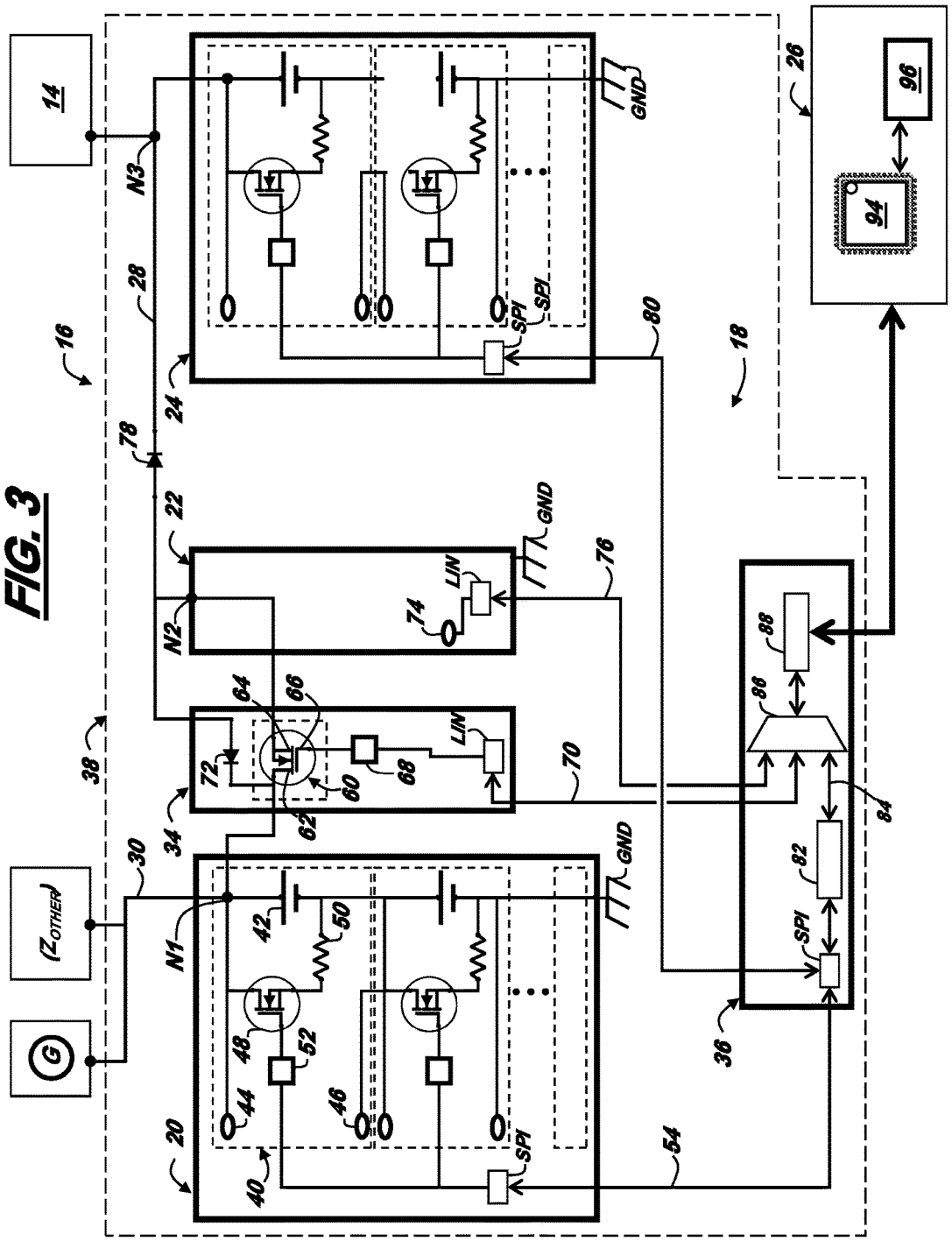

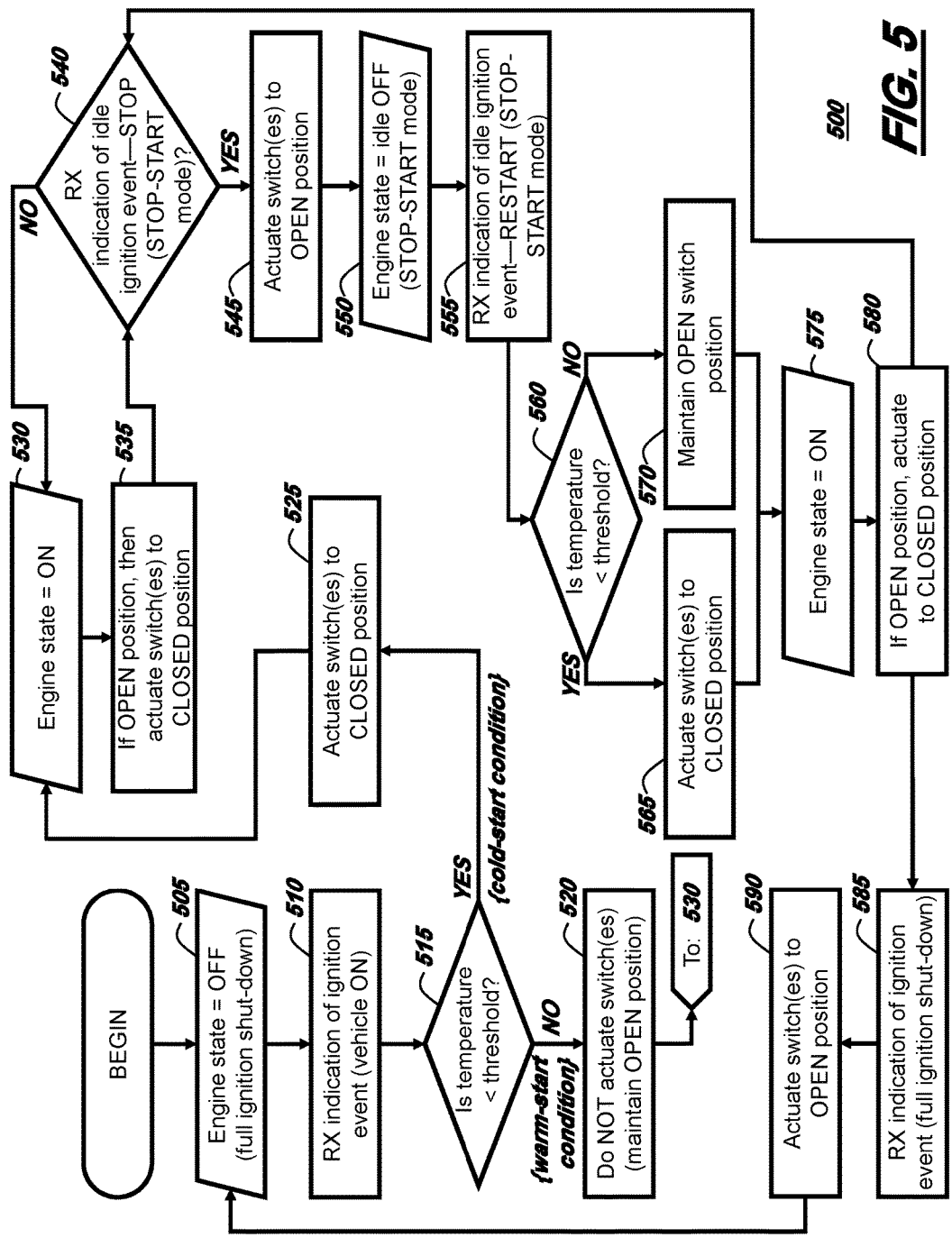

VEHICLE ENERGY MANAGEMENT

BACKGROUND

Vehicle batteries can be used to start a vehicle engine when the engine state is OFF. For example, in combustion engines, a threshold amount of electrical charge typically is required to ignite a fuel-air mixture using a spark plug; the vehicle battery may provide this threshold amount.

BRIEF DESCRIPTION OF THE DRAWINGS

FIG. 3 is a schematic view illustrating an energy management circuit that includes an isolation circuit.

FIG. 5 is a flow diagram illustrating a process of using the energy management circuit shown in FIG. 1.

DETAILED DESCRIPTION

Figure 1:
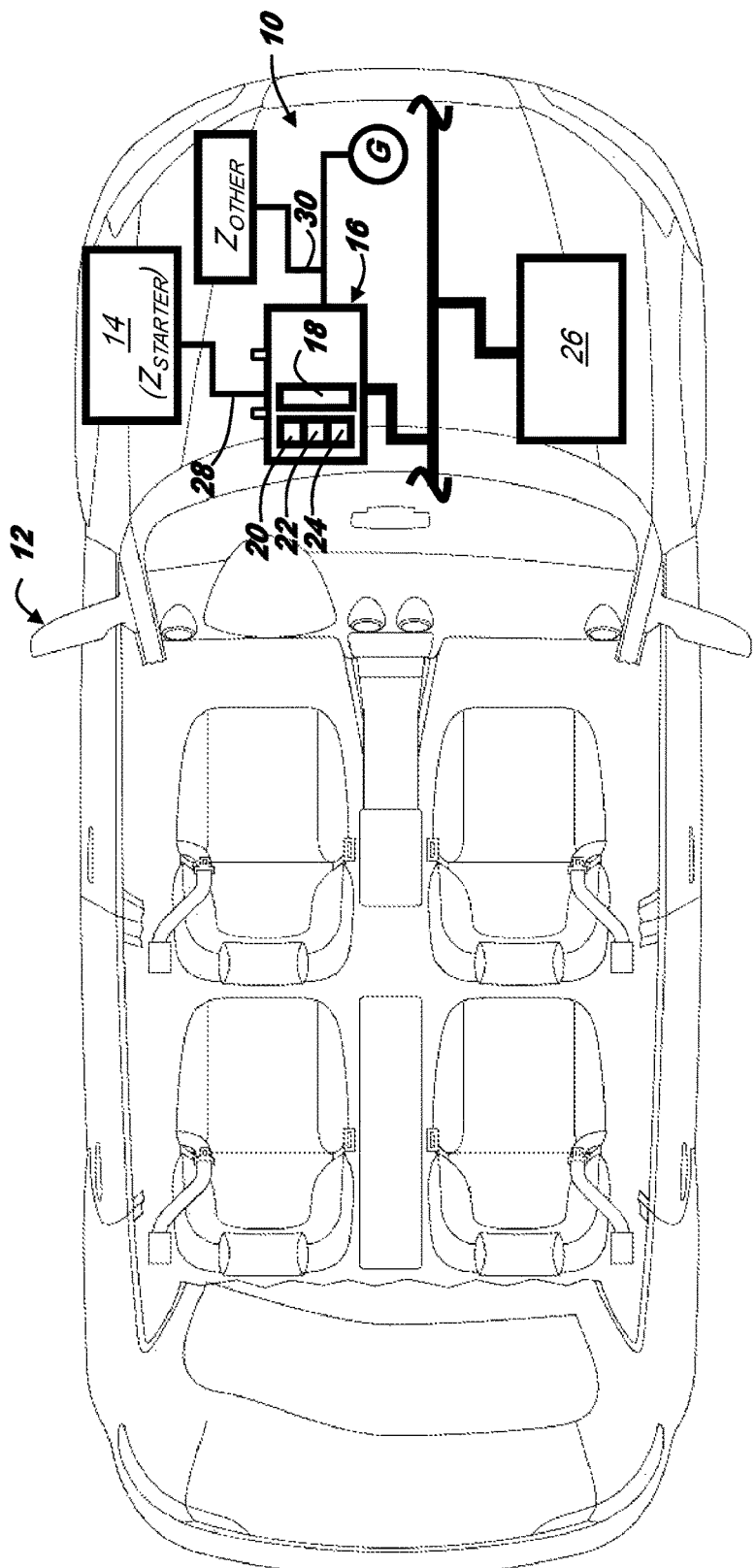
FIG. 1 is a schematic view of an energy management system for a vehicle.
Figure 2:
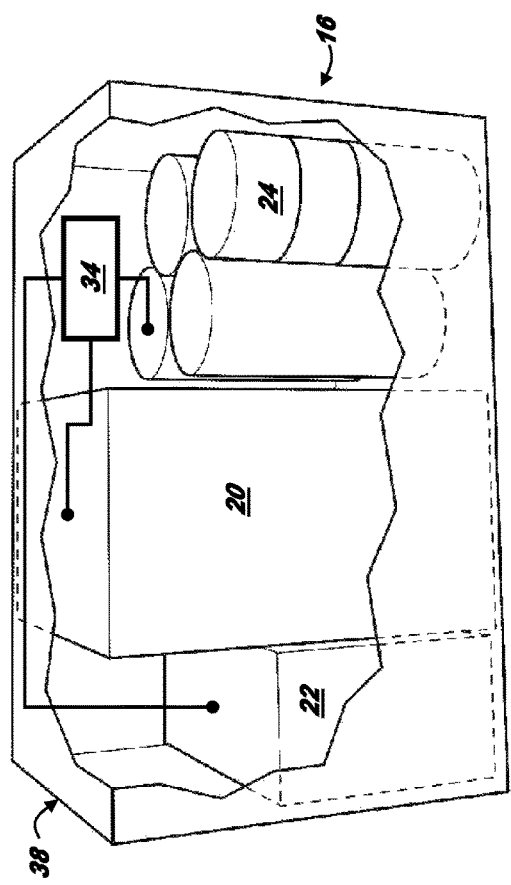
FIG. 2 is a perspective view of a vehicle battery.

With reference to the figures, wherein like numerals indicate like parts throughout the several views, an energy management system 10 for a vehicle 12 is described. The system 10 includes a starter circuit 14 (having electrical load $Z_{STARTER}$), one or more additional vehicle loads $Z_{OTHER}$, and a power generator G, each of which can be coupled to a vehicle battery 16. The battery 16 includes an energy management circuit 18 and a multiple power sources 20, 22, 24, and the system 10 further includes a computer 26 adapted to communicate with the circuit 18 and to selectively isolate at least one of the power sources (20-24) from a portion of the vehicle loads (e.g., from $Z_{STARTER}$, and/or from a portion of $Z_{OTHER}$). As will be explained below, this selective isolation may be based at least in part on engine compartment temperature and may promote voltage stabilization of the vehicle's electrical power while concurrently providing sufficient electrical power for vehicle ignition events (e.g., using starter circuit 14).

Referring to FIG. 1, vehicle 12 may be a passenger car or any other suitable vehicle (e.g., a truck, sports utility vehicle (SUV), recreational vehicle, marine vessel, aircraft, or the like). The vehicle 12 may include a combustion engine, an electric engine, a hybrid engine, or the like (not shown). In at least one illustrative example, the vehicle 12 includes a combustion engine configured to operate in a STOP-START mode. For example, when, as described below, computer 26 determines that the vehicle engine state is ON, its vehicle transmission is in DRIVE, and the vehicle 12 is stationary, then the computer 26 may cause the vehicle engine to become temporarily idle (e.g., to cease combustion operations) to thereby conserve fuel or energy. As used herein, this will be referred to as a STOP idle ignition event. For example, where vehicle 12 has an automatic transmission, the vehicle brake pedal may be required to be engaged for such a STOP idle ignition event; and where vehicle 12 has a manual transmission, the vehicle brake pedal and/or clutch pedal may be required to be engaged. Of course, these are merely examples; other suitable criteria may exist.

Similarly, with respect to the STOP-START mode (and as also will be explained in greater detail below), the computer 26 may determine to restart the vehicle engine based on one or more criteria (e.g., detection of a decrease in applied force to a vehicle brake pedal and/or clutch pedal, detection of a voltage level drop at the vehicle battery 16 (e.g., greater than a threshold), etc.). Thus, as used herein, a RESTART idle ignition event pertains to the computer 26 causing the vehicle engine to exit the temporary idle state by restarting combustion or other fuel consumption, and again operating in the engine ON state. Such STOP-START systems and their operative modes are generally known; therefore, they will not be described in greater detail here. Furthermore, for purposes of this disclosure, RESTART idle ignition events can be distinguished from normal ignition events which normal ignition events are typically based on an actuation by a vehicle user and which typically occur following longer periods of time when the vehicle engine state has been OFF (e.g., OFF for hours, days, weeks, etc.) In contradistinction, RESTART idle ignition events are computer-controlled events which immediately follow a STOP idle ignition event within a predetermined period of time (e.g., usually less than 1-2 minutes).

As discussed above, vehicle 12 may be programmed to operate in this STOP-START mode; however, this is not required. Other vehicle examples exist wherein the vehicle 12 does not operate in this mode; similarly, electric and hybrid-electric vehicle examples also exist.

The starter circuit 14 may be any suitable device to actuate the vehicle engine from an OFF state to an ON state. This includes normal ignition events, as well as RESTART idle ignition events. Continuing with the combustion engine example, the starter circuit 14 may include an ignition coil (not shown) and an ignitor (not shown) that generates a spark or heats an electrode to ignite a fuel-air mixture. Starter circuits are generally known and will not described in detail here. In general, actuation of the starter circuit 14 may result in a relatively large electrical load $Z_{STARTER}$ (e.g., electrical impedance at the time of the ignition cycle or event)—e.g., drawing electrical current from vehicle battery 16 via a first power bus 28. As will be explained more below, it may be desirable to isolate at least one of the power sources (20-24) from this load $Z_{STARTER}$ to promote voltage stabilization (e.g., with respect to the power provided to at least some of the other vehicle loads $Z_{OTHER}$). As used herein, voltage stabilization refers to minimizing a voltage delta ($\Delta V$) (e.g., a dip or spike) with respect to a predefined nominal voltage level (e.g., 12 Volts (V), 24V, etc.). For example, a dip may be based on a sudden current draw by the starter circuit 14, and a spike can result from the starter circuit 14 suddenly ceasing to draw current from battery 16. In at least one example, voltage delta ($\Delta V$) is less than a predetermined voltage delta threshold with respect to the nominal voltage level (e.g., +/−10% of the predefined nominal voltage level; however, this is merely an example; other predetermined voltage delta thresholds also exist). It should be appreciated that voltage deltas greater than this threshold may negatively affect the performance of other vehicle electronics and/or may be undesirable from a vehicle user point-of-view (e.g., as the user may notice temporary degradation in audio and/or video quality, dimming of vehicle headlamps or interior lighting, and the like).

Vehicle load $Z_{OTHER}$ pertains to the electrical impedance of one or more electronic devices (not shown) which draw power from battery 16 (e.g., via a second power bus 30). In at least one example, starter circuit 14 is not directly coupled to second power bus 30; however, this is not required. Non-limiting examples of vehicle load $Z_{OTHER}$ include impedances associated with: a vehicle instrument panel, a vehicle infotainment and/or entertainment system, a vehicle theft protection system, a vehicle climate control system, powered vehicle seating and powered mirrors, interior and exterior vehicle lighting, windshield wipers, windshield defrosters, engine cooling fans and blower motors, a vehicle fuel system, and the like. In at least one example, load $Z_{OTHER}$ includes key-off loads—i.e., electrical power sinks which draw power via the second power bus 30 when the vehicle engine state is OFF.

Generator G may be any device used to charge and/or recharge the vehicle power sources 20-24, collectively or individually. Generator G typically converts a mechanical input (e.g., shaft rotation) into electrical energy (e.g., an AC signal which then can be rectified, filtered, etc.) and used to charge an electrical storage device (e.g., such as power sources 20-24). One non-limiting example of generator G includes a vehicle alternator; however, other generator examples are also possible.

Referring to FIGS. 1-4, vehicle battery 16 can include the first power source 20, the second power source 22, the third power source 24, and the energy management circuit 18 which includes an isolation circuit 34 and a communication interface circuit 36. As used herein, a power source includes a rechargeable, electrical energy storage device. Such power sources are generally known, and will not be described in great detail here. In at least one example, the first power source 20 includes one or more lithium-type cells (e.g., non-limiting examples including lithium nickel manganese cobalt oxide (NMC), lithium iron phosphate (LFP), etc.), the second power source 22 includes one or more lead-acid-type cells (e.g., PbA), and the third power source 24 includes one or more ultracapacitor cells (e.g., or so-called supercapacitor cells). However, the lithium-type cells, PbA-type cells, and ultracapacitor-type cells are intended for illustration purposes only; other arrangements and/or cell types are possible. In at least one example, lithium-type cells, PbA cells, and ultracapacitor cells are all packaged within an H7-sized vehicle battery container 38 (e.g., an absorbent glass mat (AGM) H7 container) (see also FIG. 2).

FIG. 3 schematically illustrates an example of the energy management circuit 18. First power source 20 is shown coupled to generator G and vehicle load $Z_{OTHER}$ via the second power bus 30 and a node N1. Continuing with the example cited above, the first power source 20 includes one or more lithium-type cell circuits 40 each having an electrical cell 42 and a pair of voltage sensors (e.g., an upper voltage sensor 44 and a lower voltage sensor 46) coupled to opposite ends of the respective cell (e.g., 42). A switch 48 (and an in-series resistor 50) may be coupled in parallel with the respective cell (e.g., 42). Further, a gate drive 52 may be coupled to a gate of the switch 48; and the gate drive 52 may be coupled to computer 26 via a serial peripheral interface (SPI), an SPI connection 54, and the communication interface circuit 36. Additional cell circuits are contemplated; however, only two cell circuits are shown between the node N1 and an electrical ground GND for illustrative purposes. Thus, it should be appreciated that the available voltage of the first power source 20 can be determined by summing the voltages of each of the cells 42. Each cell circuit 40 may be identical and may operate similarly; thus, only one will be described.

In operation, generator G charges the cells, and respective load (e.g., $Z_{OTHER}$ and, as will be described below, sometimes $Z_{STARTER}$) draws power from cells 42. Skilled artisans will appreciate that it may be desirable that each cell 42 has approximately the same voltage; therefore, the computer 26 controls the switches 48 to manage the respective cell voltages. Note, when the gate drive 52 is actuated by computer 26 (e.g., via the respective SPI and communication interface circuit 36), the respective switch 48 is closed and current flows through resistor 50; and when the gate drive 48 is not actuated by computer 26, the respective switch 48 is open (e.g., no current flows through resistor 50). Thus, for example, computer 26 can receive data from sensors 44, 46 and determine a voltage value across each cell 42. Where a cell voltage value is too high (e.g., relative to other cells), computer 26 can cause switch 48 to be closed thereby reducing the effective voltage of the respective cell 42. And when the cell voltage approximates the value of other cells, the computer 26 can cause the switch 48 to be opened again. In this manner, computer 26 may control one or more cell switches 48 concurrently to thereby manage the voltage values of all of the respective cells (e.g., such as cell 42).

The isolation circuit 34 may be coupled to node N1 as well. The circuit 34 includes a power switch 60 (e.g., illustrated here as a power MOSFET) having a first terminal 62, a second terminal 64, and a gate 66 (that is coupled to a gate drive 68). The gate drive 68 is coupled a local interconnect network (LIN) interface, which in turn is coupled to computer 26 via a LIN connection 70 and communication interface circuit 36. The isolation circuit 34 also may include a diode 72 coupled to the first terminal 62 (and node N1), as well as a node N2—e.g., arranged to permit current to flow only from node N2 to node N1. In operation, when the computer 26 selectively determines to actuate the gate drive 68, then power switch 60 can operate in a first or CLOSED position, permitting vehicle electrical power to pass between node N1 and a node N2 (through the switch 60) in either direction. When the computer 26 does not actuate the gate drive 68, then power switch 60 can operate in a second or OPEN position—e.g., not permitting vehicle electrical power to pass through switch 60 (however, current may bypass switch 60, thereby passing through diode 72 from node N2 to node N1).

Figure 4:
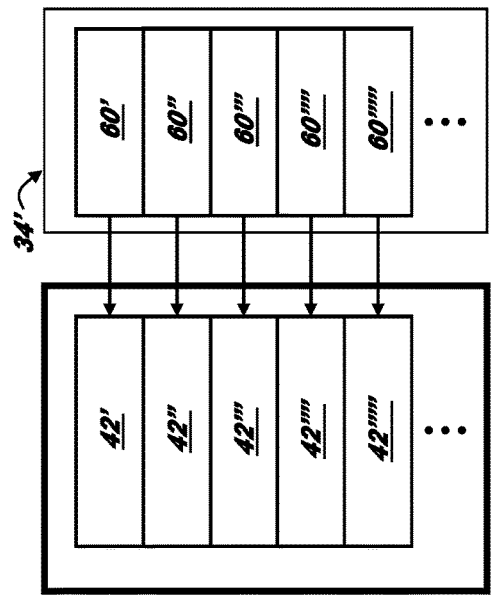
FIG. 4 is a schematic view illustrating another example of an isolation circuit.

FIG. 4 schematically illustrates another example of isolation circuit (34'). Here, a plurality of power switches 60', 60'', 60''', 60'''', 60''''', etc. is shown (each respectively coupled to cells 42', 42'', 42''', 42'''', 42''''', etc. of the first power source). Each power switch 60', 60'', 60''', 60'''', 60''''', etc. can be actuated selectively by computer 26 to permit current to pass from node N1 to node N2 through the respectively selected switches 60', 60'', 60''', 60'''', 60''''', etc. In this manner, the amount of electrical power provided during a vehicle ignition event may be tuned so that only a portion of the charge of the first power source is used during an ignition event, as described more below.

Referring again to FIG. 3, second power source 22 can be coupled to node N2 and also ground GND. In at least one example, a battery temperature sensor 74 may be coupled to computer 26 via a LIN interface, a LIN connection 76, and communication interface circuit 36; further, sensor 74 may be located on or near the second power source 22 (e.g., in container 38). As will be described in greater detail below, the computer 26 may use sensor data from sensor 74 to determine whether to actuate the power switch 60 of isolation circuit 34. In other examples, the sensor 74 is located elsewhere (e.g., in container 38 or even elsewhere in the engine compartment).

Node N2 is coupled to a node N3 via a diode 78 which permits current to move from node N2 to node N3 along first power bus 28. Further, node N3 is coupled to the starter circuit 14 and the third power source 24 (which source is further coupled to ground GND). While the third power source 24 may have a different chemical composition (e.g., than first power source 20), source 24 is illustrated as having a number of cell circuits (e.g., each being similarly configured to those of cell 42). As they may be identical, the cell circuits and their operation will not be re-described herein. Similarly, third power source 24 includes an SPI so that it may be coupled communication interface circuit 36 via an SPI connection 80.

Based on the figures and description above, it should be appreciated that when the power switch 60 is in the CLOSED position, the power sources 20, 22, 24 are arranged in parallel with respect to one another. Further, in the CLOSED position, the first and second buses 28, 30 are coupled also.

In at least the illustrated example (FIG. 3), the communication interface circuit 36 includes at least one SPI (for coupling to the SPIs of the first and third power sources 20, 24), a first bridge circuit 82 (e.g., to convert SPI data to LIN data and vice-versa), a LIN connection 84 between the bridge circuit 82 and a LIN multiplexer 86 adapted to receive multiple LIN connections (e.g., such as connections 70, 76, 84), and a second bridge circuit 88 (e.g., for changing LIN data to network data (e.g., for a controller area network (CAN) or the like). Thus, by using the techniques described above and/or by using similar communication techniques, data may be communicated between computer 26 and energy management circuit 18 of vehicle battery 16. It should be appreciated that the SPI, LIN, and/or CAN components are merely examples; other arrangements, protocols, etc. may be used instead.

Computer 26 may be a single computer (or multiple computing devices—e.g., shared with other vehicle systems and/or subsystems). In at least one example, computer 26 is a powertrain or body control module (PCM or BCM); however, these are merely examples. Computer 26 may comprise a processor or processing circuit 94 coupled to memory 96. For example, processor 94 can be any type of device capable of processing electronic instructions, non-limiting examples including a microprocessor, a microcontroller or controller, an application specific integrated circuit (ASIC), etc.—just to name a few. In general, computer 26 may be programmed to execute digitally-stored instructions, which may be stored in memory 96, which enable the computer 26, among other things, to electronically control the actuation of power switch 60 based on a vehicle engine state (e.g., ON or OFF) and the sensor data from sensor 74, among other things.

Memory 96 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 96 may store one or more computer program products which may be embodied as software, firmware, or the like.

Turning now to FIG. 5, a process 500 of decision blocks is described for selectively actuating at least one of the power sources 20-24 based on at least a temperature of the vehicle battery 16. As will be described below, this may be inferred based on sensor data received from sensor 74 (e.g., located on or within battery container 38). Process 500 begins with block 505 wherein the engine state is OFF (e.g., full ignition shut-down). As used herein, full ignition shut-down means that the engine is in a state where an ignition cycle will not occur until a vehicle actuation occurs (e.g., a key turned in an ignition switch, a keyless start using a mobile device or key fob, a pushbutton start, etc.); thus, full ignition shut-down does not include a STOP idle ignition event during the STOP-START mode (as described above).

In block 510 which follows block 505, the computer 26 may receive one or more indications of an ignition event which would change the engine state from OFF to ON. Indications of an ignition ON event could include, e.g., determining a vehicle key actuation (e.g., at an ignition switch), detecting a vehicle driver door being opened, detecting a vehicle user sitting in a vehicle driver seat, a vehicle user fastening a driver seatbelt buckle and seatbelt clip, receiving a wireless communication from a handheld device (e.g., a key fob, a Smartphone, or the like) requesting a vehicle actuation, and the like. Other indications of ignition ON events also exist; these are merely examples.

In block 515 which follows, computer 26 may determine whether a battery temperature is less than a predetermined threshold (e.g., 10° C.) using sensor data received from sensor 74 (of course, 10° C. is merely an example; other thresholds can be used instead). This threshold is merely an example; other thresholds may be used instead. As used herein, when the temperature is less than the threshold, then the computer determines a cold-start condition and the process 500 proceeds to block 525. However, as used herein, when the temperature is greater than or equal to the threshold, then computer 26 determines a warm-start condition, and the process 500 proceeds to block 520. Other temperatures could be used instead—e.g., including the temperature of the container 38, the vehicle engine itself, the engine compartment, etc.

In block 520, the isolation switch 60 is not actuated. As will be described more below, prior to the engine state being OFF (full ignition shut-down), the switch 60 may have been previously actuated to the OPEN position. Thus, in block 520, the switch 60 position may remain unchanged (i.e., the OPEN position may be maintained). In this OPEN position, the starter circuit 14 may be permitted to draw power from the second and third power sources 22, 24 only (e.g., the first power source 20 may be isolated electrically from the starter circuit 14 due to the OPEN position of switch and the polarity of diode 72).

Also in block 520, while starter circuit 14 can draw power from the second and third power sources 22, 24, load $Z_{OTHER}$ may draw power from the first and second power sources 20, 22—e.g., directly from power source 20 and from power source 22 via diode 72. Here, it should be appreciated that third power source 24 is electrically isolated from the load $Z_{OTHER}$ by the OPEN position of switch 60. Following block 520, the process proceeds to block 530.

In block 530, the engine state is changed to ON (e.g., the engine is cycled ON and combustion now occurs). Since the first power source 20 is isolated from starter circuit 14, power that is provide to load $Z_{OTHER}$ is stabilized (e.g., it may not vary more than the voltage delta ($\Delta V$) discussed above). Consequently, vehicle infotainment/entertainment systems, climate control systems, lighting systems, etc. may operate properly and without causing frustration to vehicle user(s). Of course, this is merely one example of voltage stabilization; other examples are possible.

Following block 530, the vehicle engine may mechanically actuate generator G which may begin to charge power sources 20, 22—e.g. but not power source 24 (e.g., due to the OPEN position of switch 60 and the polarity of diode 72). However, in block 535 (which follows), computer 26 may determine whether switch 60 is in the OPEN position— and if it is, computer 26 may actuate switch 60 to the CLOSED position via gate drive 68. Once the switch 60 is in the CLOSED position, generator G may provide charge to all power sources 20, 22, 24—e.g., including to source 24 via terminals 62, 64 of switch 60 (e.g., thereby bypassing diode 72).

Returning to block 515 (and as described above), process 500 may proceed instead to block 525, wherein computer 26 determines the battery temperature to be less than the threshold (the cold-start condition). In block 525, the computer 26 actuates the switch 60 to the CLOSED position prior to an ignition cycle. In this manner, the starter circuit 14 can draw power from all three power sources 20, 22, 24 concurrently. In this instance, for example, starter circuit 14 will be directly coupled to power sources 22, 24. And power source 20 will be able to provide current to starter circuit 14 via terminals 62, 64 when the switch 60 is CLOSED.

Following block 525, the process proceeds to blocks 530 and 535 as well (as described above). Thus, in block 530, the engine state is changed to ON (e.g., combustion begins to occur). In some circumstances during the ignition cycle, the value of the voltage delta ($\Delta V$) may exceed the limits discussed above; however, computer 26 effectively determines the need for so-called cold-cranking amperes is of greater importance in such circumstances than voltage stabilization. And according to this path, computer 26 will determine in block 535 that the switch 60 is already in the CLOSED position (due to execution of block 525); thus, no additional action will be taken in block 535. Thereafter, the process continues with block 540.

In block 540, the computer 26 determines whether it has received an indication of a STOP idle ignition event. If computer 26 receives an indication of the STOP idle ignition event, the process proceeds to block 545; otherwise, the process 500 loops back and repeats blocks 530-540.

Blocks 545-575 pertain to operating vehicle 12 in the STOP-START mode. For example, in block 545—having received an indication of a STOP idle ignition event— computer 26 actuates the switch 60 to the OPEN position again. In block 550 which follows, computer 26 may execute a STOP idle ignition event; e.g., the engine state is idle OFF and no combustion occurs. However, other vehicle systems may be operative (e.g., the vehicle entertainment system, headlamps, climate control system, etc.). Thus, the vehicle 12 is not fully shut-down, only temporarily so (e.g., to conserve fuel or energy).

In block 555 which follows, computer 26 receives an indication of a RESTART idle ignition event. Examples of such indication were discussed above.

Following block 555, the process 500 proceeds to block 560 wherein the computer 26 may re-determine whether the battery temperature is less than the predetermined threshold (discussed above; see block 515). In at least some combustion engine examples, when the vehicle engine state was ON for a short time and/or the vehicle 12 is exposed to extreme ambient temperatures, the battery temperature may be below the threshold. If the temperature is less than the threshold, process 500 proceeds to block 565, and if the temperature is greater than or equal to the threshold, the process proceeds to block 570.

Block 565 may be similar or identical to block 525; therefore, it will not be fully re-described here. In short, in block 565, computer 26 actuates the switch 60 to the CLOSED position for reasons similar to those described above.

Block 570 may be similar or identical to block 520; therefore, it will not be fully re-described here. In short, in block 570, computer 26 maintains the switch 60 in the OPEN position. Following block 565 or block 570, the process proceeds to block 575, wherein the engine state is cycled ON again (e.g., see also block 530). And whether the starter circuit 14 utilizes power source 20 during the ignition cycle will depend on whether the switch 60 was in the OPEN or CLOSED position—the reasons for which are similar to those described above.

Block 580 follows block 575. And block 580 may be similar or identical to block 535; therefore, it will not be re-described here. Following block 580, the process 500 may proceed to block 585 or loop back to block 540 and repeat at least some of the previous blocks. That is, process 500 may proceed through one or more idle ignition events before ultimately proceeding to block 585.

In block 585, the computer 26 receives an indication of an ignition OFF event that the vehicle 12 is being fully shut-down. Non-limiting examples of this indication (which may be used singly or in combination with each other) include: the transmission being placed in PARK, the vehicle 12 arriving at a predetermined GPS destination, a key being turned in an ignition switch, a pushbutton ignition switch being actuated by a user, vehicle 12 running out of fuel, and the like.

Based on receiving the indication in block 585, according to block 590 which follows, computer 26 may prepare for potential long-term shut down by actuating switch 60 to the OPEN position again. Depending on the nature of the indication, the actuation may occur prior to the engine being fully shut-OFF or shortly thereafter. With the switch in the OPEN position, vehicle key-off loads (e.g., load $Z_{OTHER}$) may draw only from the first and second power sources 20, 22 but not from power source 24 (as described above). Thus, in the example discussed above, the ultracapacitor cells of source 24 which may otherwise drain quickly in key-off scenarios may be electrically isolated from the vehicle loads ($Z_{OTHER}$) which would drain them. Consequently, the ultracapacitor cells of source 24 may be nearer a full charge at the time of the next ignition event, which could be relatively distant (e.g., long-term key-off scenarios being days, weeks, or even months). This may be particularly desirable since ultracapacitors are particularly suitable for the rapid discharge needed in an ignition sequence; thus, having them at a maximum voltage level promotes ignition-start reliability. Following block 590, the process 500 may loop back to block 505. Thus, the process 500 can be repeated again.

Other energy management system examples are also possible. For example, three power sources 20-24 were described above; however, in other examples, four or more power source-types may be used instead. In another example, the energy management circuit 18 could be arranged so that power sources 22, 24 were both isolated from load $Z_{OTHER}$ during engine OFF scenarios (e.g., instead of only power source 24).

Figure 6:
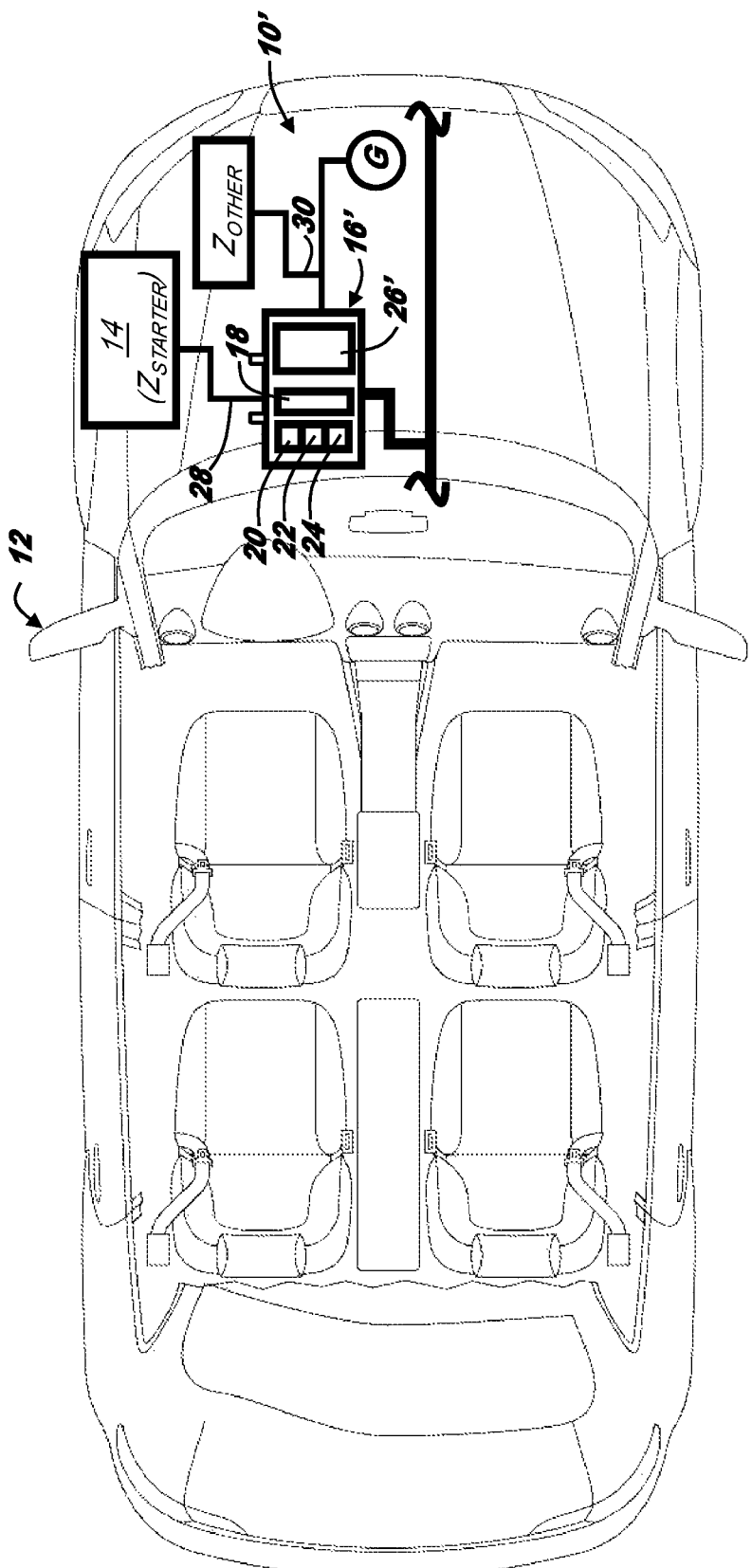
FIG. 6 is another example of an energy management system for a vehicle.

Still other energy management system (10') examples exist. For example, as shown in FIG. 6, battery 16' could include computer 26'. For example, battery 16' could include one or more processors and memory programmed to carry out at least some of blocks of process 500.

Thus, there has been described an energy management system for a vehicle. The system includes a computer which communicates with a vehicle battery having multiple power sources and an isolation circuit. The computer is programmed to control, among other things, the isolation circuit to thereby control which of the multiple power sources are coupled to a starter circuit during an ignition event. In one example, the computer makes this determination based on at least temperature data associated with the vehicle battery.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. the processor can receive the data from the sensors and determine, from the data, [what the processor is supposed to do]. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer, comprising a processor and memory storing instructions executable by the processor, the instructions comprising, to:

receive sensor data from a temperature sensor;

using the sensor data, determine whether a temperature is less than a threshold; and when the temperature is not less than the threshold, isolate from a starter, during a vehicle ignition event, a first of a plurality of power sources in a vehicle battery and provide via at least one other of the plurality, power to the starter, wherein the first of the plurality comprises lithium-type cells.

2. The computer of claim 1, wherein the battery comprises the sensor.

3. The computer of claim 1, wherein the battery comprises three different power sources coupled in parallel.

4. The computer of claim 3, wherein the three power sources include lithium-type cells, lead-acid-type cells, and ultracapacitor-type cells carried by an H7-sized container.

5. The computer of claim 1, wherein the battery comprises a switch, wherein the instructions further comprise, to: actuate the switch to a first position based on a cold-start condition; and actuate the switch to a second position based on a warm-start condition.

6. The computer of claim 5, wherein, in the second position, at least one of the plurality of power sources is coupled to the starter during the ignition event.

7. The computer of claim 5, wherein, in the second position, at least the first of the plurality is isolated from the starter during the ignition event.

8. A computer comprising a processor and memory storing instructions executable by the processor, the instructions comprising, to:

control, based on a temperature, which of a plurality of different power sources of a vehicle battery are coupled to a starter circuit during a vehicle ignition event, the plurality of different power sources packaged within an H7-sized vehicle battery container.

9. The computer of claim 8, wherein the instructions further comprise, to: prior to controlling which of the plurality of different power sources are coupled to the starter circuit, receive sensor data from a temperature sensor.

10. The computer of claim 9, wherein the battery comprises the temperature sensor.

11. The computer of claim 8, wherein the battery comprises three different power sources coupled in parallel.

12. The computer of claim 11, wherein a first power source comprises lithium-type cells, a second power source comprises lead-acid-type cells, and a third power source comprises ultracapacitor-type cells.

13. The computer of claim 12, wherein each of the lithium-type cells, the lead-acid-type cells, and the ultracapacitor-type cells are carried by an H7-sized container.

14. The computer of claim 8, wherein the battery further comprises an isolation circuit comprising at least one switch, wherein the instructions further comprise, to: control the at least one switch.

15. The computer of claim 14, wherein the instructions further comprise, to: actuate the at least one switch to a first position based on a cold-start condition; and actuate the at least one switch to a second position based on a warm-start condition.

16. The computer of claim 15, wherein, in the first position, at least three of the plurality of different power sources are coupled to the starter circuit during the ignition event.

17. The computer of claim 16, wherein the ignition event changes an engine state to ON.

18. The computer of claim 15, wherein, in the second position, at least one of the plurality of different power sources is coupled to the starter circuit during the ignition event.

19. The computer of claim 15, wherein, in the second position, at least one of the plurality of different power sources is isolated from the starter circuit during the ignition event.

20. The computer of claim 8, wherein the vehicle event is associated with a STOP-START mode in a vehicle.

* * * * *